United States Patent Office 3,313,615
Patented Apr. 11, 1967

3,313,615
COATED FERTILIZERS
Richard E. Formaini, Colonial Heights, Va., assignor to Allied Chemical Corporation, New York, N.Y., a corporation of New York
No Drawing. Filed Jan. 13, 1964, Ser. No. 337,180
14 Claims. (Cl. 71—64)

This invention relates to a new fertilizer composition and process for making the same. More specifically, this invention relates to a process for producing a new waterproof fertilizer composition which does not release its nitrogen or other plant nutrient content to the soil at a rapid rate.

For several years much experimentation by agricultural technologists and agronomists has been conducted to prepare fertilizer compositions which do not release their nitrogen or other plant nutrient content to the ground at a rapid rate but provide plant nutrient for an extended period of time. These products were to serve an additional purpose of obviating the "burning" experienced with high nitrogen content fertilizers which readily release their nitrogen content to the soil by solubilization due to rainfall. Ureaform was produced as a consequence of this research and provides a composition which obviates "burning" and maintains a fair percentage of its nitrogen content in water insoluble form for release to the soil over an extended period of time. Ureaform however does not maintain a high percentage of its nitrogen in a form which is readily available to plants throughout a six months growing period. Moreover, ureaform is at present expensive to produce thus driving the price of the fertilizer upwards and making some of the cheaper but less suitable fertilizers more economically attractive.

It is an object of this invention, therefore, to produce a fertilizer composition which maintains its nitrogen content in a manner where it is not readily solubilized by water.

It is a further object of this invention to provide a new fertilizer composition, i.e., a waterproof fertilizer composition which when applied to the soil will not cause burning or the like and can be produced at a cost substantially less than ureaform.

It is a still further object of this invention to provide a process for producing such a fertilizer composition.

Other objects and advantages of the instant invention will become more apparent from the following complete description and appended claims.

According to this invention a fertilizer composition is waterproofed to maintain its nitrogen content or other plant nutrient in a less water available form by:

(1) dusting thereon a coating of a finely divided water insoluble powder, the particle size of said powder being at least small enough to pass through a 100 Tyler mesh screen, preferably amorphous sulfur;

(2) spraying onto the fertilizer composition so dusted a solution of gilsonite in a liquid hydrocarbon and evaporating said liquid hydrocarbon;

(3) dusting thereon a calcium or zinc salt of a fatty acid, said fatty acid having between 12 and 18 carbon atoms;

(4) spraying onto the so-treated composition gilsonite dissolved in a liquid hydrocarbon, and evaporating said liquid hydrocarbon.

(5) and, preferably but not essentially, continuing the spraying of gilsonite in a liquid hydrocarbon together with the evaporation of the liquid hydrocarbon with intermittent dusting of the treated composition with sulfur or a calcium or zinc salt of a fatty acid, the acid containing between 12 and 18 carbon atoms until the desired water-proofing coat is provided on said fertilizer composition. The product so obtained by this process is a fertilizer composition, such as pelleted urea, which composition has a waterproof coating comprising gilsonite, a finely divided water insoluble powder and a calcium or zinc salt of a fatty acid said acid having between 12 and 18 carbon atoms.

In the preferred practice of my invention, I employ as a fertilizer composition pelleted urea which is subsequently dusted with amorphous sulfur, the so-treated urea having sprayed thereon gilsonite dissolved in benzene at temperatures between about 40 and 85° C. with evaporation of substantially all of the benzene immediately after spraying. I then treat the so-treated urea with a dust coating of calcium stearate followed by a similar spraying with gilsonite which step is followed by a second dusting with calcium stearate and a third spraying of gilsonite dissolved in benzene with substantial benzene evaporation, the product then being treated with another dust coat of surfur followed by a fourth spray coat of gilsonite dissolved in benzene. In so doing, I obtain a waterproofed urea fertilizer composition wherein the nitrogen content is not totally leached out for about five months thereby providing soil so fertilized therewith with a steady supply of a plant nutrient over an extended period of time.

The term "fertilizer composition" as used herein contemplates organic as well as inorganic fertilizer ingredients, whether or not water soluble, and mixtures of such ingredients together or with soil conditioners such as vermiculite. Organic fertilizer compositions include urea and ureaform and inorganic fertilizer compositions include ammonium salts such as $NH_4NO_3$, $(NH_4)_2SO_4$, $(NH_4)HSO_4$, $(NH_4)_3PO_4$, mono ammonium phosphate and diammonium phosphate, $KCl$, $K_2O$ and the like.

It is preferred that the fertilizer composition to be waterproofed be in a pelleted form rather than a granular form as the waterproof coating provided by my process adheres better to the former thus enabling the product to withstand more rainfall before all plant nutrition is dissipated to the soil. Coated granular fertilizer compositions give satisfactory results, however.

In performing my process the temperature should never exceed the melting point of the solid water soluble fertilizer composition, 132.7° C. in the case of urea, and it is preferred that the temperature be in the range of 40 to 85° C. If the temperature exceeds 85° C. the product, normally a free flowing black product will clump together and resemble a blackberry due to the softening of the gilsonite in the coating which product is not preferred for said fertilization. Temperatures below 40° C. while applicable are too low to provide ready evaporation of the liquid hydrocarbon solvent in which the gilsonite is dissolved. With respect to the liquid hydrocarbon solvents application in my process, I can use any such solvent in which gilsonite dissolves and which is inactive with respect to the other ingredients used in my process. However, I have found that benzene due to its boiling point of about 80° C. and further because of cost considerations is preferred as the liquid hydrocarbon solvent to be employed.

Fertilizer compositions which can be coated according to the present invention include those which are both waterproof and water insoluble. However, no particular advantage is provided in coating water insoluble fertilizer compositions as these compositions do not release their nitrogen rapidly to the soil and thus do not need the waterproofing provided by my process. The size of the fertilizer particles employed in my process is not critical although I prefer that the products have a Tyler mesh screen size of between 8 and 12. Fertilizer compositions having a size larger than 8 mesh can be readily coated according to my process but larger particles when applied as fertilizer to the soil may give too high concentration of fertilizer at a particular point in the soil. Fertilizer compositions having a Tyler mesh screen size smaller than 12 require more gilsonite together with more finely divided water-insoluble powder and salt of fatty acid to provide the same coat as compositions lying within the preferred range. This is due to the larger total surface area of these particles.

The purpose of applying a finely divided water-insoluble powder directly to the fertilizer composition is to fill up pores in the composition so that when the gilsonite is sprayed thereon there will be no voids between the fertilizer composition and the gilsonite coating. This is particularly true where urea is employed as the fertilizer composition. The amount of finely divided water-insoluble powder used is, therefore, dependent upon the amount of fertilizer composition to be coated with the gilsonite and the particle size of the fertilizer composition, together with the specific fertilizer composition employed. Moreover, sulfur or other finely divided powder has a conditioning effect somewhat like the effect provided by the above fatty acid salts and appears to prevent clumping of the fertilizer during the spraying operations. Since the purpose of the water-insoluble powder is to fill any pores on the fertilizer composition and to prevent clumping it will be evident that a fine dusting of the same will be a sufficient amount for my process. While there are numerous water-insoluble finely divided powders applicable in my process, I prefer sulfur in the amorphous form as its particle size is extremely small and can fulfill the above functions. Sulfur is moreover preferred because it has fertilizer value and because of the cost advantage attendant with its use over similar powders which are produced as a result of expensive processes. The powder to be dusted on the fertilizer composition should have a particle size small enough to pass through a 100 Tyler mesh screen as larger particles, say crystalline particles, are generally too large to fill the pores in the fertilizer composition.

The purpose of the calcium or zinc salt of the fatty acid, the fatty acid having between 12 and 18 carbon atoms, is to modify the nature of the gilsonite to form a highly water-repellent, shiny, hard coating on the fertilizer composition. These fatty acid salts also prevent clumping of the fertilizer. While the amount of calcium or zinc salt may vary according to my process I prefer an amount of salt between 1.5 and 4% by weight of the total finished product. Amounts above 4% tend to blend too much with the gilsonite thereby penetrating the gilsonite coating and providing only a soft waterproof coat. On the other hand, where the percentage of salt is below 1.5%, due to this relatively small amount not all of the gilsonite is modified to form the aforementioned water-repellent, shiny, hard coating, thereby leaving some areas of the coating subject to water penetration with subsequent leaching out of the water soluble fertilizer composition therein. The remainder of the coat is preferably divided approximately equally between gilsonite and sulfur. Preferably, several coatings of each material are applied. The specific calcium and zinc fatty acid salts applicable in this invention include salts of myristic acid, lauric acid, palmitic acid, and most preferable stearic acid. The salts of fatty acids useful in this invention include salts of unsaturated fatty acids having between 12 and 18 carbon atoms particularly oleic acid and 9-dodecylenic acid. Stearic acid is preferred since it is readily available, occurring in large amounts (10 to 30% in animal fats) and is available at less cost than most of the other acids specifically recited above.

When using benzene as the liquid hydrocarbon solvent in which the gilsonite is dissolved, it is preferred that the amount of gilsonite therein be in an amount between 5 and 15% by weight. Amounts above 15% by weight tend to clog the spraying apparatus and to necessitate shutdown while an amount below 5% while suitable, requires a large amount of benzene which in the process is subsequently evaporated and must be recovered for an economical process. To evaporate the hydrocarbon hot air at 60° C. can be passed over the product as the coating proceeds.

The product of my invention preferably has a coating of between 8 and 22% based on the weight of the product. A coating of less than 8% will be insufficient to prevent water penetration over a long duration. Products having a gilsonite coat of more than 22% while suitable for use are so waterproof that the nitrogen or other plant nutrient therein may be released too slowly for satisfactory plant nutrition and is, therefore, generally unnecessary. In particular, I have found that urea pellets having a coating of 14% based on the weight of the product provide an attractive leach pattern on the product. Specifically, a free-flowing product having a coating of 14% based on the weight of the product its coating consisting of by weight 1/8 calcium stearate, 3/8 sulfur and 1/2 gilsonite after soaking in water for 3 months was found to have 60% of its pellets intact. The coated fertilizer composition was pelleted urea (40% N). The same product on further testing revealed 12% of its coated pellets were intact after five months of soaking in water.

In performing the process of my invention, it is not necessary to apply more than one dust coating of the finely divided water insoluble powder or more than one dust coating of the calcium or zinc salt of the fatty acid as above described as a sufficient waterproof coating on the fertilizer composition is provided by restricting the waterproofing procedure thusly. However, as indicated above, I prefer subsequent dust coatings of sulfur or fatty acid salt, e.g., calcium stearate with intermittant spraying of gilsonite dissolved in a liquid hydrocarbon accompanied with evaporation of the hydrocarbon. After the fatty acid salt has been intially dusted on the intermediate product with subsequent spraying of gilsonite dissolved in liquid hydrocarbon, I can, according to my invention, apply as a subsequent dust coat either a finely divided water insoluble powder such as amorphous sulfur or a fatty acid salt as above described. I prefer that the material in subsequent dust coatings be sulfur because its cost is substantially less than the cost of an equivalent amount of a fatty acid salt. With regard to dust coats applied after the initial dust coating with the fatty acid salt it is to be realized that subsequent finely divided powders applied as subsequent dust coats need not be the same material as applied in the initial powder dusting. For instance, if sulfur is employed as the initial dust coating, i.e., the coating applied to the fertilizer composition, another water insoluble finely divided powder such as talc can be applied as the third dust coat, i.e., the coat following the dust coating with the fatty acid salt and second spraying of gilsonite in hydrocarbon.

In order to illustrate the nature of this invention and the manner of practicing the same the following examples are presented. In these examples all percentages are percentages by weight unless otherwise indicated. Temperature is in degrees centigrade and units of weight are in grams.

EXAMPLE 1

200 grams of pelleted urea having a Tyler mesh size between 8 and 10 was placed in a rotating stainless steel beaker mounted at about 45° from horizontal. The beaker was constructed with flights at right angles to the wall and rotated at about 45 r.p.m. The urea pellets were warmed to 60° C. with a heat gun and by means of hot plate placed beneath the beaker. The urea was then coated in the following steps:

Step 1. 4 grams of powdered sulfur having a particle size at least small enough to pass through a 325 Tyler mesh screen was dusted onto the urea and the resulting powder coated pellets were sprayed with 80 grams of a 5% solution of gilsonite (4 grams) in benzene. During spraying and for several minutes after, air at 60 to 70° C. was directed onto the rotating pellets in order to evaporate substantially all of the benzene.

Step 2. The procedure of step 1 was repeated except that four grams of calcium stearate powder was used in place of the sulfur.

Step 3. The procedure of step 1 was repeated in order to add a third gilsonite coating.

Step 4. The procedure of step 1 was repeated in order to provide a finished product comprising urea waterproofed with a coating of gilsonite, sulfur and calcium stearate. The total coating based on the weight of the product was 14%. The product was black in color and consisted mostly of single pellets smoothly coated.

Some of the pellets were placed in water about 25° C. to observe the extent of the waterproofing. After 87 days of soaking of the pellets in water, 25 pellets were examined. 60% of these pellets contained solid urea which was apparently unattacked by water. Thus, after 87 days the fertilizer composition maintained residual plant nutrient material for slow distribution to soil. After 145 days of soaking in water the product contained 12% solid urea also apparently unattacked by the water.

EXAMPLE 2

Pelleted urea (200 grams) of 8 to 10 Tyler mesh size was coated as in Example 1 except that in the third step calcium stearate was used in place of amorphous sulfur. The product so obtained had a total coat based on the weight of the product of 14%. After 87 days soaking of the pellets in water at 25° C., 44% contained solid urea, and after 145 days 27% contained solid urea apparently unattacked by water penetration.

EXAMPLE 3

Pelleted urea (200 grams) of 8 to 10 Tyler mesh size was coated in a manner similar to Example 1 except that different ratios of coating materials were used. The following steps in coating the fertilizer composition were employed.

Step 1. 8 grams of powdered sulfur was dusted onto the urea pellets and the resulting powder coated pellets were sprayed with 90 grams of a 3.75% solution of gilsonite (3 grams gilsonite) in benzene. During spraying and for several minutes thereafter air at a temperature of 60 to 70° C. was directed onto the pellets to evaporate the benzene.

Step 2. The procedure of step 1 (this example) was repeated except that 8 grams of calcium stearate and 3 grams gilsonite were applied.

Step 3. Step 2 of this example was repeated.

Step 4. Step 1 of this example was repeated.

The total coating thereby obtained was 18% based on the weight of product. After 94 days soaking of pellets in water at 25° C., 72% contained solid urea, and after 152 days, 43% contained solid urea unattacked by water penetration.

Test 1

A turf of Kentucky blue grass in 15" x 15" x 4" deep trays was fertilized by applying the product of Example 1 to the soil surface at the rate of 200 pounds N per acre. For comparison, ammonium sulfate, uncoated pelleted urea and ureaform (commercial) were also applied at the same rate to grass in control trays. All grass trays were twice leached to simulate a 1.4-inch rainfall (one week after fertilizing and six weeks after fertilizing). The approximate amount of water draining from the trays was 750 ml. in each case. Each grass tray had applied to the soil therein 3,250 mg. of nitrogen. Grass in each tray was clipped periodically and clippings dried and weighed. Yield of dry grass from the various fertilizers at various clipping times was as follows:

| Times of Clipping, Days After Fertilization | Yield of Dry Grass From Various Fertilized Trays, grams | | | |
|---|---|---|---|---|
| | Coated as in Example 1 | Uncoated Urea | Uncoated Ammonium Sulfate | Ureaform |
| 4 | 2.0 | 1.9 | 1.3 | 1.8 |
| 13 | 6.3 | 5.3 | 4.4 | 3.2 |
| 20 | 5.4 | 6.0 | 6.7 | 2.6 |
| 27 | 4.8 | 6.3 | 6.2 | 1.7 |
| 34 | 5.8 | 6.8 | 7.0 | 1.1 |
| 47 | 4.7 | 5.5 | 6.8 | 1.2 |
| 60 | 6.5 | 5.0 | 6.0 | 1.9 |
| 71 | 5.1 | 2.4 | 2.2 | 1.8 |
| 88 | 4.3 | 2.7 | 2.5 | 2.5 |
| 108 | 5.5 | 2.4 | 1.0 | 1.7 |

After 198 days of growth the grass samples in each tray were analyzed to determine the amount of nitrogen absorbed by the grass. The grass of the tray fertilized by the new coated fertilizer composition showed the presence of 2,607.3 mg. of nitrogen while the grass of the trays fertilized with the other materials showed as follows:

Mg.
Uncoated urea _____ 2,429.4
Uncoated ammonium sulfate _____ 2,337.6
Ureaform _____ 1,393.5

The remainder of the nitrogen in all cases was either leached away by the simulated rainfalls or remained present in the soil.

This example indicates that the product of the present invention supplies plant food over a longer period than does uncoated urea or uncoated ammonium sulfate. As compared with ureaform (commercial), product of the present invention shows better release of its plant food over the period of the test.

EXAMPLE 4

Pelleted urea (400 grams of 8–10 mesh size) was placed in a rotating stainless beaker mounted at about 45° horizontal. The beaker was constructed with flights at right angles to the wall and rotated at 45 r.p.m. The pellets were warmed to 60° C. with a heat gun as in Example 1. The urea was then coated in the following steps:

Step 1. 4 grams powdered amorphous sulfur was added to the urea and the resulting powder coated pellets were sprayed with 80 grams of 10% solution of gilsonite and asphalt (6 g. gilsonite and 2 g. asphalt) in benzene. During spraying and for several minutes after, air at 60 to 70° C. was directed onto the rotating pellets in order to evaporate the benzene.

Step 2. The procedure of step 1, this example, was repeated except that 8 grams of zinc stearate powder was used in place of the sulfur.

Step 3. Step 1 of this example was repeated.

Step 4. Step 1 of this example was again repeated.

The product so obtained had a total coating based on the weight of the product of 11.2%. The product was black in color and consisted mostly of single pellets smoothly coated. After 21 days soaking of 25 pellets in water, 25 pellets were examined. 40% contained solid urea. After 35 days, 36% contained solid urea.

EXAMPLE 5

In order to illustrate that the instant process is applicable to fertilizer compositions other than urea, the following example is set forth. In this example a mixed fertilizer having a nitrogen to phosphorus ($P_2O_5$) to $K_2O$ ratio of 28 to 14 to 14 was coated with gilsonite-asphalt (3:1) sulfur and calcium stearate to yield a 24–12–12 coated fertilizer.

400 grams of a pelleted 28–14–14 fertilizer consisting of 54.3% urea, 23.1% KCl and 22.5% mono ammonium phosphate, screened to −8 +10 Tyler mesh was placed in 4-liter stainless steel beaker, mounted on a rotating shaft and equipped with three ½″ flights. The material was heated to 50° C. Eight grams of powdered sulfur was added in one portion followed by a spray of 70 grams of a benzene solution containing 7.5 wt. percent gilsonite and 2.5 wt. percent asphalt. As soon as all of the solvent was evaporated from the residual mass and the pebbles became free-flowing, eight grams of calcium stearate was added in one portion followed by a spray of 70 grams of the gilsonite-asphalt solution described above. When most of the solvent was evaporated, 8 grams of powdered sulfur was added, followed by a spray of 90 grams of the same gilsonite-asphalt solution. Finally, another 8 grams of sulfur and a spray of 100 grams of the gilsonite-asphalt solution was added.

The coated product weighed 455.1 grams, indicating 55.1 grams coating was added. The coated product was a 24–12–12 fertilizer.

EXAMPLE 6

This example shows coating of a 12–12–12 granulated fertilizer. The material used had a Tyler screening analysis as follows:

| Size: | Percent |
|---|---|
| +8 | 15.1 |
| −8+10 | 44.0 |
| −10+12 | 16.2 |
| −12+14 | 12.2 |
| −14+16 | 5.0 |
| −16+20 | 3.5 |
| −20 | 4.1 |

Four hundred grams of the 12–12–12 fertilizer was placed in a stainless beaker (4-liters) equipped with three one-half-inch flights and mounted on a rotating face plate inclined at an angle of about 30° with the horizontal. Eight grams of sulfur was added and the mixture heated by means of two infrared lamps to 50° C. Seventy grams of a solution containing 7.5% gilsonite and 2.5% asphalt in benzene was sprayed on the material while maintaining the temperature at 50° C. Eight grams of calcium stearate was next added, followed by a second portion of 70 grams of the gilsonite-asphalt solution in benzene. Eight grams of sulfur was added followed by 90 grams of the gilsonite-asphalt solution. A final portion of eight grams of sulfur was added followed by a final portion of 100 grams of the gilsonite-asphalt solution in benzene. The dried, coated fertilizer weighed 458.4 grams. This indicates a 14.6% weight coating based on 400 grams of starting material.

Some slight agglomeration of the smaller particles of the material occurred; these did not interfere with granular, smooth flowing characteristics of the finished product. The agglomerated particles were about the same size or only slightly larger than the largest single particles of the starting fertilizer.

Soak tests carried out on the material showed that it compared favorably with prilled urea coated in the same manner.

It is apparent from the foregoing that the process of the instant invention provides new and useful fertilizer compositions which by the waterproofing provided do not release their plant nutrient ingredients readily to the soil when it is so fertilized. Thus these products overcome the "burning" heretofore experienced with cheap grade fertilizers. It furthermore provides a product which can be produced at a cost substantially less than ureaform or other similar organic fertilizer compositions and has properties unobtainable by ureaform and the like. This is illustrated particularly in Test I above.

The above disclosure has been set forth in order to illustrate the nature of this invention and the manner of practicing the same and has not been set forth to limit the scope of the instant invention. Accordingly, the instant invention should be construed in the light of its spirit and scope using the appended claims as a guide thereto.

I claim:
1. A waterproof fertilizer composition comprising a fertilizer composition having a Tyler mesh screen size between 8 and 12 coated with a waterproof coating comprising an inner layer of a finely divided water insoluble powder selected from the group consisting of sulfur and talc, the particle size of said powder being small enough to pass through 100 Tyler mesh screen, said inner layer being overlaid with dual coatings of gilsonite modified by applying between said dual coatings a salt of a fatty acid of an element selected from the group consisting of calcium and zinc, said fatty acid having between 12 and 18 carbon atoms.

2. A waterproof fertilizer composition according to claim 1 wherein said waterproof coating consists of by weight ⅛ calcium stearate, ⅜ sulfur and ½ gilsonite and said fertilizer composition is urea.

3. A waterproof fertilizer composition according to claim 1 wherein said salt of fatty acid is present in an amount of 1.5 to 4% based on the weight of the total finished product and the remainder of the waterproof coating is divided equally by weight between gilsonite and sulfur.

4. A waterproof fertilizer composition according to claim 1 wherein said waterproof coating is between 8 and 22% by weight based on the weight of the product.

5. A method for waterproofing a fertilizer composition to maintain its nitrogen or other plant nutrient content in a less water available form which comprises:
  (a) dusting onto a fertilizer composition the major portion of which has a Tyler mesh screen size between 8 and 12, a finely divided water-insoluble powder selected from the group consisting of sulfur and talc; the particle size of said powder being at least small enough to pass through a 100 Tyler mesh screen;
  (b) spraying onto the fertilizer composition so dusted, a solution of gilsonite dissolved in a readily evaporated liquid hydrocarbon and evaporating said liquid hydrocarbon;
  (c) dusting thereon a fatty acid salt of an element selected from the group consisting of calcium and zinc; said fatty acid having between 12 and 18 carbon atoms;
  (d) spraying onto the so-treated composition gilsonite dissolved in a readily evaporated liquid hydrocarbon and evaporating said liquid hydrocarbon.

6. A process according to claim 5 wherein said so-treated fertilizer composition subsequent to the second spraying of gilsonite dissolved in a readily evaporated liquid hydrocarbon and evaporation of the hydrocarbon, is treated alternately by dusting onto the treated composition a coating composition selected from the group consisting of powders selected from the group consisting of sulfur and talc, the powder being small enough to pass through a 100 Tyler mesh screen and fatty acid salts of elements selected from the group consisting of calcium and zinc, the fatty acid having between 12 and 18 carbon atoms, and spraying thereon gilsonite dissolved in a readily evaporated liquid hydrocarbon together with subsequent evaporation of the liquid hydrocarbon until the desired waterproofing coat is provided on said fertilizer composition.

7. A process according to claim 6 wherein subsequent to the second evaporation of said liquid hydrocarbon, a fatty acid salt of an element selected from the group consisting of calcium and zinc is dusted onto the so treated composition and gilsonite dissolved in a readily evaporated liquid hydrocarbon is sprayed thereon with subsequent evaporation of said liquid hydrocarbon.

8. A process according to claim 6 wherein subsequent to the second evaporation of said liquid hydrocarbon, a finely divided water-insoluble powder, selected from the group consisting of sulfur and talc, the particle size of said powder being small enough to pass through a 100 Tyler mesh screen, is dusted onto the so treated composition and gilsonite dissolved in a readily evaporated liquid hydrocarbon is sprayed thereon with subsequent evaporation of said liquid hydrocarbon.

9. A process according to claim 6 wherein said fertilizer composition is urea.

10. A process according to claim 6 wherein said fertilizer composition is maintained at temperatures between 40 and 85° C.

11. A process according to claim 6 wherein the fatty acid salt is present in an amount between 1.5 and 4% based on the total weight of the finished product.

12. A process according to claim 6 wherein said powder is sulfur.

13. A process according to claim 6 wherein said salt of fatty acid is calcium stearate.

14. A process according to claim 6 wherein said salt of a fatty acid is zinc stearate.

References Cited by the Examiner
UNITED STATES PATENTS

| | | | |
|---|---|---|---|
| 2,175,083 | 10/1939 | Keil | 71—64 |
| 2,399,987 | 5/1946 | Cordie et al. | 71—64 |
| 2,936,226 | 5/1960 | Kaufman et al. | 71—64 |
| 3,014,783 | 12/1961 | Young | 71—64 |
| 3,024,098 | 3/1962 | Austin et al. | 71—64 |
| 3,034,858 | 5/1962 | Vives | 71—64 |
| 3,070,435 | 12/1962 | Reusser et al. | 71—64 |
| 3,192,031 | 6/1965 | Zaayenga | 71—64 X |
| 3,219,433 | 11/1965 | Brewster et al. | 71—64 |
| 3,232,740 | 2/1966 | Sor et al. | 71—64 |

DONALL H. SYLVESTER, *Primary Examiner.*

ANTHONY SCIAMANNA, *Examiner.*

T. D. KILEY, *Assistant Examiner.*